United States Patent Office 3,431,639
Patented Mar. 11, 1969

3,431,639
METHOD OF PRODUCING SLOT WINDINGS FOR ELECTRICAL MACHINES
Carl Reimer and Hans Pörsch, Nuremburg, Germany, assignors to Siemens Aktiengesellschaft, Berlin-Siemensstadt, Germany
Filed Apr. 29, 1965, Ser. No. 451,887
Claims priority, application Germany, Apr. 30, 1964, S 90,854
U.S. Cl. 29—605   5 Claims
Int. Cl. H01f 7/06; H02k 15/00

ABSTRACT OF THE DISCLOSURE

Method of producing multi-layer slot windings with insulating jackets bonded by plastic material for electrical machines includes the steps of winding conductors into multi-layer flat coils disposed substantially in a single plane and conjointly winding respective separating insulating sheets of plastic material between the respective layers and covering by the sheets all sides of the individual conductors in the merger zones between slot portions and end-turn portion thereof; widening the opening of the coil to an extent greater than ultimately required; pressing an insulating envelope upon the slot portion of each multi-layer coil; narrowing the widened opening of the coil to the required ultimate width; then hardening the envelopes of a multiplicity of enveloped coils simultaneously in a platen press; and thereafter shaping the end turns of the coils to the ultimate shape of the machine winding.

---

Our invention relates to a method of producing multi-layer slot windings with pressed-on insulating jackets bonded by synthetic plastic, particularly winding coils for insertion into the slots of electrical machines.

Such jacketed coils are suitable for operation at high voltage. The conventional high-voltage coils with pressed-on jackets or envelopes of shellac-mica sheet material for insulating the coil conductors from the metal walls of the slots, are stretched to ultimate shape before the enveloping jacket insulation is pressed onto and about the coils. If the insulating jacket material contains synthetic plastic as a bonding agent, an additional process requiring several hours time is needed for curing and hardening the bonding agent. If the pressed jackets are individually hardened in pressure molds, the production is considerably more costly because the number of simultaneously hardenable jackets is limited in practice.

It is an object of our invention to avoid the difficulties heretofore encountered and to greatly reduce the cost and time required for the manufacture of multi-layer slot windings for electrical machines having insulated jackets which contain synthetic plastic as bonding material.

Another, more specific object of the invention is to improve the production method or such multi-layer machine coils with resin-bonded insulating jackets in such a manner that a considerably larger number than heretofore can be simultaneously hardened.

To achieve these objects, and in accordance with our invention, we wind the conductors to multi-layer coils and conjointly wind with the conductors a number of respective separating sheets of synthetic plastic which we place between the respective conductor layers so that the sheets cover all sides of the individual conductors in the merger zones between the slot portion and the end-turn portion of each conductor. After thus winding the conductors and separating sheets, we press under heat (iron) the insulating envelope material, such as mica-flake or sheet material and thermosettnig synthetic plastic, upon the slot portion of each multi-layer coil while the coil has a preliminary shape different from the ultimate shape of the machine windings to be produced. Thereafter, we harden many such enveloped coils simultaneously in a platen press. Only after the envelopes are thus hardened and the coils are removed from the platen press, do we stretch and bend the end turns of the coils to their ultimate shape.

The essential prerequisite for employing the platen presses is the fact that the coils are stretched and otherwise converted to their ultimate shape only after the insulating envelopes are pressed onto the coils and are hardened thereupon; and this is made possible by providing the abovementioned separating sheets at the specified localities.

The invention will be further explained with reference to the accompanying drawing showing by way of example an embodiment of a multi-layer coil structure according to the invention in different stages of production.

Figure 1:
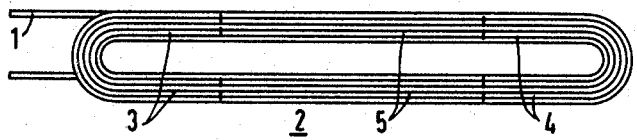
FIG. 1 shows a single multi-layer coil wound from a rod or strip-shaped conductor.
Figure 2:
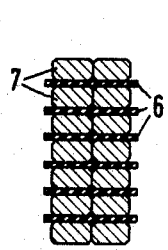
FIG. 2 shows schematically a cross section through part of the same coil.
Figure 3:
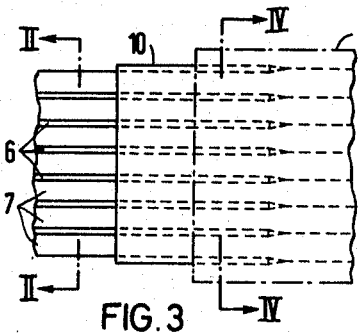
FIG. 3 shows a portion of the multi-layer coil with an insulating envelope ironed onto the slot portion thereof.

As shown in FIG. 1, an insulated wire or strip 1 is wound to the shape of a flat coil 2, of which the portions denoted by 3 and 4 are to form the end-turns in the coil when subsequently completed, whereas the straight portion 5 is to be placed into the slots of an electrical machine structure such as a stator or rotor of a motor or generator. According to FIG. 2, respective separating sheets 6 of adhesive synthetic plastic, for example adhesive strip or tape, such as pressure-sensitive sheets or tapes of polyethyleneterephthalate available in the trade under the name Hostaphan or Mylar, are inserted between the individual conductor layers 7 within the end-turn portions 3 and 4. These sheets 6 extend from the end turns somewhat into the range of the slot portion 5 so as to proturde into the insulating envelope 8 which, according to FIG. 3, is subsequently ironed onto the slot portion 5 of the coil, the envelope consisting of the above-mentioned material such as a mixture of micafolium and thermosetting resin.

Figure 4:
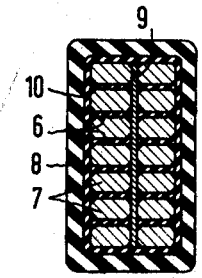
FIG. 4 is another cross section similar to FIG. 2 but showing the location of the envelope material according to FIG. 3.

In the regions between the the end-turn portions 3, 4, on the one hand, and the slot portion 5 on the other hand, the individual conductors 9, according to FIG. 4, are surrounded on all sides by separating sheets 10, and consequently are also separated by these sheets from the envelope material 8. In this maner the individual conductors are protected from baking together due to any resinous material as may trickle or seep out of the envelope. It is preferable, as a rule, to deposit a tenaciously viscous, i.e. tacky, mass, for example silicone rubber or other silicone mass directly upon the group of wound conductors beneath the separating sheet, which mass retains its elastic property when subsequently subjected to the temperatures of the heating or hardening treatments.

Figure 5:
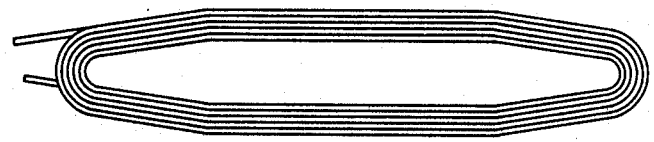
FIG. 5 illustrates the same multi-layer coil as FIG. 1 but in deformed condition just prior to applying the envelope material.
Figure 6:
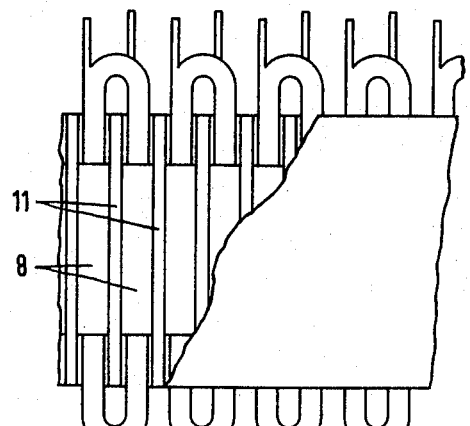
FIG. 6 is a plane view and FIG. 7 a front view of a number of coils during the curing and pressing operation in a platen press.
Figure 7:
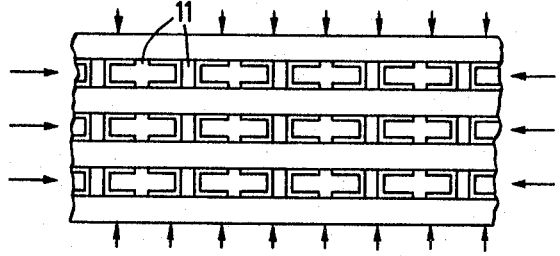

Before applying the envelope material, the coil is pulled apart to a slight extent, as shown in FIG. 5. The envelope material 8 is then pressed or ironed upon and about the slot portion of the coil and is slightly prepressed. Thereafter, the coil is shaped back to the original shape according to FIG. 1. In this flat shape, the coils are placed into a platen press in which they are cured by simultaneous application of heat and pressure, according to FIGS. 6 and 7. Spacer pieces 11 are placed between the individual coils in each level of the press to preserve the prescribed dimensions. As apparent from FIG. 7, several layers of coils are thus placed above one another into the respective levels of a multi-platen press to be hardened simultaneously. After hardening, the coils are removed from the press and then stretched to the ultimate shape, whereafter any conventional further treatment may be applied.

The above-mentioned pressing or ironing of the envelope material 8 upon the slot portion of each coil may be effected, for example, by wrapping insulating tape or sheet material impregnated with synthetic resin about the straight slot portions 5, while applying heat and pressure, such as with the aid of a flat iron in a manner generally similar to the ironing of garments. Thus, the wrapped layers ultimately will tightly surround the straight portions 5 and convert to a stiff envelope by curing of the synthetic resin impregnation.

We claim:

1. Method of producing multi-layer slot windings with insulating jackets bonded by plastic material for electrical machines, which comprises the steps of winding conductors into multi-layer flat coils disposed substantially in a single plane and conjointly winding respective separating insulating sheets of plastic material between the respective layers and covering by said sheets all sides of the individual conductors in the merger zones between slot portion and end-turn portion thereof; widening the opening of the coil to an extent greater than ultimately required; pressing an insulating envelope of hardenable material upon the slot portion of each multi-layer coil; narrowing the widened opening of the coil to the required ultimate width; then hardening the envelopes of a multiplicity of enveloped coils simultaneously in a platen press by the application of heat and pressure; and thereafter shaping the end turns of the coils to the ultimate shape of the machine winding.

2. Method of producing multi-layer slot windings with insulating jackets bonded by plastic material for electrical machines, which comprises the steps of winding conductors into multi-layer flat coils disposed substantially in a single plane and conjointly winding respective separating insulating sheets of plastic material between the respective layers and covering by said sheets all sides of the individual conductors in the merger zones between slot portion and end-turn portion thereof; deforming the coil so as to have a wider and shorter coil opening than ultimately required; pressing an insulating envelope of hardenable material upon the slot portion of each multi-layer coil; then narrowing the width of the coil opening between the jacketed slot portions to the desired ultimate width; thereafter hardening the envelopes of a multiplicity of enveloped coils simultaneously in a platen press by the application of heat and pressure; and shaping, after hardening, the end turns of the coils to the ultimate shape by stretching and bending.

3. The method of producing slot windings according to claim 1, which comprises performing said hardening by pressing several layers of coils simultaneously above each other on respective levels of a multi-platen press.

4. The method of producing slot windings according to claim 1, which comprises coating said merger zones of said respective conductors with a tacky adhesive prior to inserting a separating sheet therebetween so that the tacky adhesive is located between the respective separating sheet and said conductors at said merger zones.

5. The method of producing slot windings according to claim 4, wherein said adhesive is a silicone mass.

References Cited

UNITED STATES PATENTS

| | | | |
|---|---|---|---|
| 2,970,936 | 2/1961 | Richardson | 174—120 X |
| 2,975,088 | 3/1961 | Rossman et al. | 174—120.4 X |
| 3,200,357 | 8/1965 | Olsen et al. | 29—155.57 X |
| 3,202,558 | 8/1965 | Gottung et al. | 174—120 X |
| 3,263,308 | 8/1966 | Torossian | 29—155.5 |

FOREIGN PATENTS

| | | |
|---|---|---|
| 609,366 | 9/1948 | Great Britain. |
| 852,150 | 10/1960 | Great Britain. |

JOHN F. CAMPBELL, *Primary Examiner.*

ROBERT W. CHURCH, *Assistant Examiner.*

U.S. Cl. X.R.

29—596, 597; 156—56; 174—120, 121; 310—208